United States Patent [19]

Quester et al.

[11] 4,255,869

[45] Mar. 17, 1981

[54] METHOD OF AND APPARATUS FOR THE OPERATION OF TREATMENT PROCESSES FOR BULK GOODS AND THE LIKE

[76] Inventors: Karl W. Quester, Pfarriusstr. 12; Johannes Haas, Glueeler Str. 151, both of 5000 Köln 41; Hans-Joachim Ulbrich, Schildgesstr. 40, 5040 Brühl; Dieter Schröder, Märchenstr., 5000 Köln 80, all of Fed. Rep. of Germany

[21] Appl. No.: 953,315

[22] Filed: Oct. 20, 1978

[30] Foreign Application Priority Data

Oct. 21, 1977 [DE] Fed. Rep. of Germany ....... 2747232

[51] Int. Cl.³ .................... F26B 21/10; F26B 21/12
[52] U.S. Cl. ................................... 34/25; 34/31; 34/46; 34/48; 34/50
[58] Field of Search ............... 131/134, 135, 136, 137, 131/138; 34/52, 56, 46, 48, 50, 141, 25, 31

[56] References Cited

U.S. PATENT DOCUMENTS

| 2,768,629 | 10/1956 | Maul | 34/46 |
| 3,075,700 | 1/1963 | Bishop | 236/DIG. 8 |
| 3,372,488 | 3/1968 | Koch et al. | 34/46 |
| 3,396,476 | 8/1968 | Eaves | 34/52 |
| 3,599,343 | 8/1971 | Nielsen | 34/52 |
| 3,905,123 | 9/1975 | Fowler et al. | 34/46 |
| 3,948,277 | 4/1976 | Wochnowski | 34/46 |
| 3,961,425 | 6/1976 | Swanson et al. | 34/52 |
| 4,004,594 | 1/1977 | Wochnowski et al. | 131/136 |

*Primary Examiner*—Larry I. Schwartz
*Attorney, Agent, or Firm*—Neil F. Markva

[57] ABSTRACT

A method of treating bulk goods requiring control of process parameters including moisture content, temperature, and quantity of goods through the use of a process computer. The computer evaluates and continuously monitors and modifies variations in the supply material in relation to a particular mathematical formula. Modification procedures are determined by the process computer and then actuated via the control circuitry.

12 Claims, 1 Drawing Figure

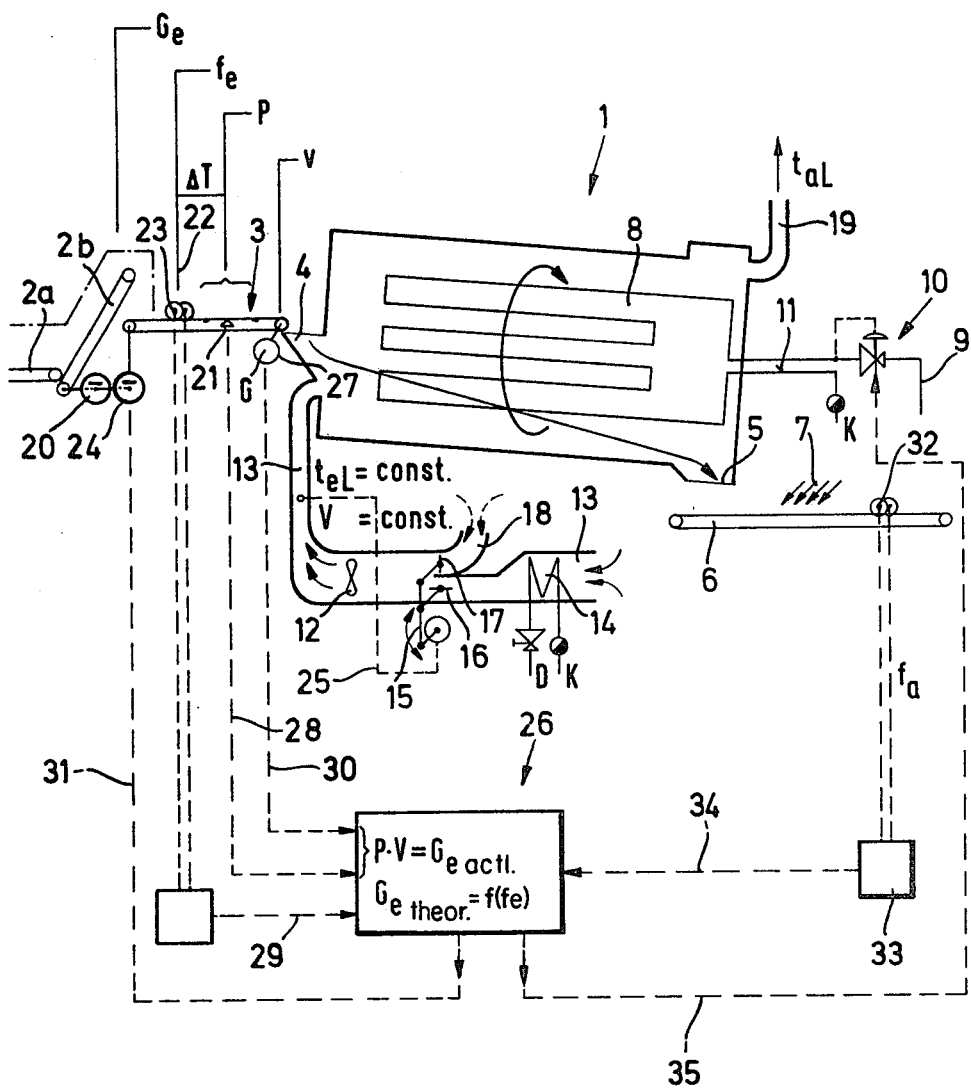

METHOD OF AND APPARATUS FOR THE OPERATION OF TREATMENT PROCESSES FOR BULK GOODS AND THE LIKE

TECHNICAL FIELD

The present invention relates to a method of and apparatus for the operation of treatment processes for bulk goods and the like. More particularly, the purpose is to modify the technological properties of the treatment processes and to employ control measures to provide an end product having constant physical characteristics and quality.

BACKGROUND OF THE INVENTION

Various control methods are already known for the treatment of bulk goods. These include measuring and determining the values relating to the condition of the goods before the treatment phase. The values are then compared with predetermined theoretical values for the purpose of influencing the goods during the treatment phase by variable treatment measures governed by the measurement data. Drying processes frequently occur in the course of manufacturing or treating vegetable bulk goods such as grain, beet slices, tobacco or pharmaceutical bulk goods. This type of material is more or less moist at the outset and a predetermined degree of moistness is required to be maintained in the finished end product.

Difficulties are incurred when the known control systems for drying the material are required to maintain the predetermined moisture content within narrow tolerance limits. This is especially true when the known control systems are used in continuous production plants having a relatively high output demand. Frequently, there are delays in maintaining the quantity constant and occasionally faulty batches of the end product result. That is, there is a time-lag involved in effecting the modifications in the technology, i.e., the characteristic physical properties of the material are greater than the time available for influencing the material during the continuous working. The effectiveness of the known control devices occurs belatedly so that occasionally, inferior material below established quality standards is obtained. There is only a short period of treatment time available during the processing of the material. This material is unable to benefit from the action of measures resulting from the data obtained. Consequently, there is a time lag before the particular action controlling the drying process becomes completely effective. Because the properties of the raw material fluctuate considerably, wide fluctuations occur in the technological properties of the end product.

SUMMARY OF THE INVENTION

The primary object of the invention is to provide a system of regulating the treatment of a bulk material outside the treatment phase of the operation to produce predetermined requirements in the end product through the use of mechanisms which are simpler and more rapid in operation than prior art processes.

Another object of the invention is to provide a process and apparatus which will avoid treatment measures which are slow in becoming effective in processes which are difficult to regulate so as to accelerate their efficacy.

The process of treatment according to the invention described herein is carried out or effected under strictly constant conditions. The treatment parameters of the process are maintained constant with the initial material supply to be treated being subjected to modifications which adapt the treatment to the prescribed constant conditions and are easy to regulate.

A control measure is selected to act on the initial supply of the material being treated. The control measure is thereby switched from the treatment phase of the material to the initial phase involving supply of the material to the treating zone. Thus, it is possible to provide an end product with the desired properties while largely obviating the delay factor in the control measure being effective during the treatment process itself. The measurement and control measures according to the present invention now relate solely to the easily controllable variability of the effect of the action on the material being supplied. Consequently, the technological conditions associated with the treatment itself may be maintained constant during the treatment phase. At the same time, any temporary fluctuations in the process may be compensated by simply adjusting the conditions in the initial material being supplied to the treating zone.

With the present invention, it is no longer necessary to consider the importance of the delay factor associated with the delay in coming into effect of modify control measures during the treatment phase. Generally no problems are met while maintaining the conditions of the process parameters constant during the treatment phase. It is simply necessary to bring the supply of the initial product into line with the constant treatment measures by determining the fluctuating properties together with the appropriate adjustment. Control measures of the present invention are easier to operate than in the prior art and result in a method having a higher degree of reliability and accuracy.

An end product having excellent quality is guaranteed. Further, there is an increase in output in a continuous operation because the proportion of waste material in the process is smaller.

Another feature of the invention is the use of a process computer for effecting the modification procedure used on the initial product being supplied to the treating zone. The computer continuously monitors the variations in the initial product and determines the necessary modification procedure which is immediately effected. In this connection, the parameters determined by the process computer may be employed as theoretical values for control circuits through which circuits the modification procedures for the initial product are actuated.

The method and apparatus of this invention are most advantageously used in manufacturing or producing products having a predetermined moisture content. More specifically, it is desired to obtain a homogeneous permeation of moistness in a product which is to undergo a drying treatment. A certain time is required to evenly distribute the drying of the material. This time cannot be curtailed. At the same time, a continuously operating production plant frequently does not have the necessary time conditions available. This problem is obviated through the use of the method and apparatus as described herein.

In the specific embodiment of the invention, a rotary dryer is used for treating fibrous material such as shredded tobacco to be used for the manufacture of cigarettes. The very strict tolerance requirements are maintained with respect to the moisture content of the shredded tobacco conveyed to modern cigarette making machines. These machines have a relatively high output and must obtain optimum yield and quality of the resultant product. There is a higher moisture content present in the shredded tobacco than is permitted in the cigarettes themselves. Thus, the drying process is used to bring the moisture content within the required tolerance limits.

Rotary dryers of the type used in the treatment of shredded tobacco include drum-type dryers, belt dryers, current dryers, and the like. These dryers generally include a heated outer cover and/or built in heating elements from which the heat is conveyed to the tobacco by contact and/or by radiation. The dryers may also include a ventilation system which produces a convection drying effect and further effects the removal of water condensation. The major portion of the heat is conveyed to the material by heat surfaces in the rotary dryers while the ventilation component conveys a relatively small amount of the heat away.

The temperature of the predetermined heat surface areas basically govern the quantity of heat imparted to the material being dried. The heat surface areas have a very large heat capacity so that variations in the heating system do not result in a rapid change in the temperature of the heat surfaces. Thus, the temperature used in the drying process is not changed until after a significant delay. At the same time, the time taken by the material to be dried in passing through the rotary dryer is relatively short, e.g., on an average of between five and ten minutes. Consequently, temperature variations in the heating surfaces do not have a noticeable effect upon the portion of the material located within the heating zone of the drum. When the initial product being supplied to the heating zone has fluctuating characteristics, a relatively long time elapses before the change in conditions in the dryer produces the desired moisture content.

It is relatively difficult to effect variations in operating conditions quickly in a drying machine or rotary dryer and to produce the required effect continuously in the material being dried. However, it is generally simple to control the heat capacity of the dryer so that it remains constant. The invention as described herein advantageously uses the characteristic behavior of the dryer to produce material for drying so that the end product has a constant moisture content regardless of fluctuating conditions of the material being supplied to the system.

The quantity of heat required for drying is calculated from the relevant output per hour, the predetermined final moisture content and the initial moisture content of the material being supplied to the system. The characteristic data of the material to be dried, e.g., quantity, moisture content, and temperature, are checked, measured, and evaluated. The initial values of moistness and temperature are preferably taken as fixed. The value of the quantity may be slightly altered. From the given initial values of moistness and temperature, the computer determines the particular quantity of material which can be dried by the available quantity of heat produced by the dryer in light of the desired predetermined final moisture content. This constitutes the theoretical value of the quantity of material. A dosage balance is used to adjust the quantity of material being supplied by a conveyor to this theoretical value. An excess or deficiency reading may be temporarily rectified by a buffer located in the production line.

Longer term variations in the theoretical value for the quantity of material may occur during lengthy production operations. In this instance, supervision of the characteristics of the end product by the computer can provide a revision of the required quantity of heat from the dryer due to any long term variation. By monitoring the final moisture content in the theoretical, actual comparison, correction values can be passed to the computer. Special programs may be inserted in the computer for the starting and finishing situations.

BRIEF DESCRIPTION OF DRAWINGS

Other objects of this invention will appear in the following description and appended claims, reference being made to the accompanying drawing which forms a part of the specification. The sole drawing in the application is a schematic flow diagram showing a controlled drying installation made in accordance with this invention.

DETAILED DESCRIPTION

A trough conveyor 2a conveys material to a rising transfer belt 2b. A drive motor 20, e.g., a d.c. motor, drives rising belt 2b and trough conveyor 2a. An intermediate electromagnetic clutch (not specifically shown), is used to effect the drive of trough conveyor 2a. The material, subsequently delivered to charging conveyor 3, is fed into receiving funnel 4 of a rotary dryer, generally designated 1. The material falls through the gravity outlet aperture 5 of dryer 1 to a conveyor 6. A cooling apparatus 7 is used to cool the material as it is discharged by conveyor 6. Dryer 1 includes steam heated plates 8. Steam is supplied to plates 8 by pipe 9 via control valve 10. Condensate from plates 8 is eliminated through condensate pipe 11.

Pipe 13 directs warm air into rotary dryer 1 via a fan 12. A heat register 14 is used to heat the incoming air conveyed through pipe 13. Regulator 15 including flaps 16 and 17 which control the supply of warm air and fresh air through pipes 18 and 13, respectively. Fumes and the like are discharged through the outlet pipe 19 located at the end of dryer 1.

A photoelectric device may be positioned in the lateral walls of the trough of conveyor 2a to monitor any possible accumulation of the dosed material at the transition between the horizontal trough conveyor 2a and the rising transfer belt 2b. If the photoelectric device is interrupted by the massing or accumulation of the material, the electromagnetic clutch is released and trough conveyor 2a is stopped until the level of the material has been reduced.

A dosage belt balance 21 is used in conjunction with charging conveyor 3. A moisture meter 22 is used to check the moisture content of the material at any given moment. The measurement of the moisture content is effected preferably without contact with the dosed material. For example, such a measurement may be effected by infra-red measurement, by an electrocapacitive method, by the conductance method, or by the conductance method using feeler electrodes 23 or by any other known mechanism.

Dosage belt balance 21 is driven by a separate electric motor 24. In a specific embodiment, drive motor 20 is coupled to drive motor 24 with an electric shaft via a potentiometer. The potentiometer is used to synchronize the speed of the rising transfer belt 2b with that of the charging conveyor belt 3 operating with balance 21.

The secondary pressure control reducing valve 10 is used to maintain the steam pressure constant for heating the system of steam tubes or pipes 8 within dryer 1. The temperature and quantity of air drawn into shaft 13 also remains constant. The mixer flap assembly 15 including flaps 16 and 17 and thermostatic control circuit 25 maintain the air temperature constant in pipe 13. Thus, rotary dryer 1 operates with constant heat provision due to the control of constants in heating tubes 8 and air inlet shaft 13.

The process computer, generally designated 26, is used to synchronize the charge, the heat output and input of dryer 1 with respect to the moisture content of the material after cooling on conveyor 6 by the cooling assembly 7. That is, after the moisture content has been determined, the weight of charge Ge is established by using process computer 26. This may be obtained in accordance of the following mathematical formula:

$$G_e = \frac{Q}{[Y]}$$

$$[Y] = \left[ \frac{100 - f_e}{100} \cdot C_T \cdot (t_a - t_e) + \frac{f_e}{100} \cdot C_w \cdot (t_a - t_e) + \frac{(100 - f_a) - (100 - f_e)}{100 - f_a} \cdot [C_w \cdot (100 - t_a) + 2260] \right]$$

The symbols employed have the following meaning:

| | | |
|---|---|---|
| $G_e$ | kg/h | weight of charge, i.e. initial weight |
| $Q$ | KJ/h | heat output, or heat requirement |
| $t_e$ | °C. | temperature on entry |
| $t_a$ | °C. | temperature at exit |
| $f_e$ | % $H_2O$ | moisture-content of tobacco at entry |
| $f_a$ | % $H_2O$ | moisture-content of tobacco after cooling |
| $T$ | min | time |
| $p$ | kg | bearing load (belt balance) |
| $v$ | m/sec | speed of belt (belt balance) |
| $c_w$ | $\frac{KJ}{kg}$ K | specific heat capacity of water |
| $c_T$ | $\frac{KJ}{kg}$ K | specific heat capacity of tobacco |

The expression Y is the sum of three terms. The first term relates to the heating of the material to be dried and the second term relates to the heating of the water content. The third term relates to the heat of vaporization of the moisture to be evaporated.

Pulse generator 27 produces single pulses related to the moisture content of material. Pulses are also generated for the momentary bearing weight through control lead 28. It is desired to obtain the largest possible number of single pulses of moisture content and the momentary varying weight in process computer 26 while, at the same time, bearing in mind how many pulses the analog-converter or computer is capable of handling. In this embodiment, computer 26 should be capable of processing at least 60 pulses per minute.

Analogous input signals are directed to computer 26 through control leads 28, 29, and 30 for the momentary bearing load, the initial moisture content, and the momentary conveyor belt speed, respectively. Computer 26 produces an output signal which controls the belt speed of dosage belt balance 21 via motor 24 and control line 31. The output signal of process computer 26 is a theoretical value for the belt speed of dosage belt balance 21. Corresponding to this theoretical value $G_e$ $_{theor.} = f(f_e)$ stands as actual value, the product $G_e$ $_{actl.} = P \cdot v$ to be formed in the computer 26.

The material, e.g., tobacco, is conveyed to the drying process having a moisture content which varies within certain limits or fluctuates around a mean value. The momentary values of moisture content and quantity are measured. From these measured momentary values, the quantity of heat required to dry this amount of material is then calculated and compared with the present efficiency of dryer 1. If a difference occurs between the heat requirement and the present adjusted dryer efficiency, dosage belt balance 21 is used to effect adjustment of the quantity of tobacco to compensate for the difference. The dosage belt balance 21 operates substantially instantaneously. Thus, the drying process may be carried out under constant conditons with any excess of deficiency reading of the supply of the initial bulk goods being compensated by operation of a buffer which disposes of excess material or dispenses extra material for deficiencies.

The heat given off the dryer 1 must remain constant. Therefore, a trend measurement is taken to control the quantity of heat given off to maintain this constancy. Moisture meter 32 determines the moisture content of the material at the outlet point after cooling on conveyor 6. Converter 33 transmits the sensed moisture content via large interval pulses to process computer 26 through control lead 34. When necessary and at corresponding time intervals, process computer 26 then produces a change in control valve 10 to effect the heat supply to dryer 1 by control lead 35. Inverse processes, e.g., moistening operations, may be influenced in a similar manner as has been described for the drying function.

While the method of and apparatus for the operation of treatment processes for bulk goods and the like has been shown and described in detail, it is obvious that this invention is not to be considered as being limited to the exact form disclosed, and that changes in detail and construction may be made therein within the scope of the invention, without departing from the spirit thereof.

We claim:

1. A method of continuously treating bulk goods requiring control of process parameters including moisture content, temperature and quantity of goods, said method comprising:
   (a) providing a supply of bulk goods in a charge to be treated with respect to moisture content,
   (b) providing a moisture changing treating zone having a predetermined temperature and a flow of gaseous medium directed therethrough,
   (c) providing a treated material discharging zone,
   (d) continuously sensing a first moisture content of the continuous supply of bulk goods and continuously sensing a second moisture content of the treated material in the discharging zone,
   (e) continuously sensing a third moisture content of said gaseous medium in the treating zone,
   (f) continuously controlling the rate of supply and temperature of said gaseous medium through the treating zone at amounts effective to provide constant treatment conditions in said treating zone,
   (g) monitoring said first and second moisture contents and the parameters of the rate of said supply of bulk goods to be treated with a process computer,
   (h) evaluating the monitored parameters with said computer to determine the weight of said charge according to the following mathematical formula:

$$G_e = \frac{Q}{[Y]}$$

$$[Y] = \left[ \frac{100 - f_e}{100} \cdot C_T \cdot (t_a - t_e) + \frac{f_e}{100} \cdot C_w \cdot (t_a - t_e) + \frac{(100 - f_a) - (100 - f_e)}{100 - f_a} \cdot [C_w \cdot (100 - t_a) + 2260] \right]$$

wherein the symbols have the following meaning:

| | | |
|---|---|---|
| $G_e$ kg/h | | weight of charge, i.e. initial weight |
| Q KJ/h | | heat output, or heat requirement |
| $t_e$ °C. | | temperature on entry |
| $t_a$ °C. | | temperature at exit |
| $f_e$ %H$_2$O | | moisture-content of tobacco at entry |
| $f_a$ %H$_2$O | | moisture-content of tobacco after cooling |
| T min | | time |
| p kg | | bearing load (belt balance) |
| v m/sec | | speed of belt (belt balance) |
| $c_w \frac{KJ}{kg}$ K | | specific heat capacity of water |
| $c_T \frac{KJ}{kg}$ K | | specific heat capacity of tobacco, and |

(i) controlling the supply of bulk goods to be treated in response to the determination in said evaluating step to maintain a constant end-product being discharged from said discharging zone.

2. An apparatus for treating bulk goods requiring control of process parameters including moisture content, temperature and quantity of goods, said apparatus comprising:
   (a) means for supplying a charge of bulk goods to be treated with respect to moisture content to a moisture treating zone,
   (b) means for maintaining the process parameters constant within the moisture treating zone,
   (c) means including a process computer for evaluating the rate of supply, moisture content of the goods to be treated, and the moisture content of the end product,
   (d) said computer being effective to produce an evaluation of the weight of bulk goods in said charge according to the following formula:

$$G_e = \frac{Q}{[Y]}$$

$$[Y] = \left[ \frac{100 - f_e}{100} \cdot C_T \cdot (t_a - t_e) + \frac{f_e}{100} \cdot C_w \cdot (t_a - t_e) + \frac{(100 - f_a) - (100 - f_e)}{100 - f_a} \cdot [C_w \cdot (100 - t_a) + 2260] \right]$$

wherein the symbols have the following meaning:

| | | |
|---|---|---|
| $G_e$ | kg/h | weight of charge, i.e. initial weight |
| Q | KJ/h | heat output, or heat requirement |
| $t_e$ | °C. | temperature on entry |
| $t_a$ | °C. | temperature at exit |
| $f_e$ | % H$_2$O | moisture-content of tobacco at entry |
| $f_a$ | % H$_2$O | moisture-content of tobacco after cooling |
| T | min | time |
| p | kg | bearing load (belt balance) |
| v | m/sec | speed of belt (belt balance) |
| $c_w$ | $\frac{KJ}{kg}$ K | specific heat capacity of water |
| $c_T$ | $\frac{KJ}{kg}$ K | specific heat capacity of tobacco, |

(e) means for controlling the rate of supply in response to any evaluation obtained by the process computer to maintain the remaining process parameters constant.

3. An apparatus as defined in claim 2 wherein
said supplying means includes conveyor means and drive means to operate said conveyor means,
said evaluating means includes means for measuring the value of the momentary bearing load on the conveyor means, means for determining the value of the momentary speed of the conveyor means, and means for sensing the value of the degree of moistness of the bulk goods,
said values being received as pulses by said process computer,
said process computer being connected with said drive means to regulate the speed of the conveyor means.

4. The apparatus as defined in claim 3 wherein
said conveyor means includes a conveyor belt and said load measuring means includes a belt balance.

5. The apparatus as defined in claim 3 wherein
said process computer is effective to determine variations in the initial supply material comprising the bulk goods to be treated and actuate the necessary modification procedures at least at intervals in said treating process.

6. A method of treating bulk goods requiring control of process parameters including moisture content, temperature, and quantity of goods, said method comprising:
   (a) supplying a charge of bulk goods to be treated with respect to moisture content to a moisture treating zone to produce an end product having a constant predetermined moisture content,
   (b) maintaining the process parameters including a supply of heat constant within the moisture treating zone to effect drying of said bulk goods,
   (c) evaluating the rate of supply, moisture content of the goods to be treated and the moisture content of the end product, and
   (d) controlling the rate of supply in the supplying step in immediate response to any evaluation obtained in the evaluating step to maintain the remaining process parameters constant,
   (e) the evaluating step includes providing a process computer and control circuits, continuously monitoring the parameters in said evaluating step with the process computer which determines variations in the initial supply material comprising the bulk goods to be treated and the necessary modification procedures,
   (f) said variations and necessary modification procedures determined by the process computer being employed as theoretical values for the control circuits through which said modification procedures are actuated,
   (g) the computer evaluates the weight of the charge of bulk goods according to the following mathematical formula:

$$G_e = \frac{Q}{[Y]}$$

-continued $$[\eta] = \left[ \frac{100 - f_e}{100} \cdot C_T \cdot (t_a - t_e) + \frac{f_e}{100} \cdot C_w \cdot (t_a - t_e) + \frac{(100 - f_a) - (100 - f_e)}{100 - f_a} \cdot [C_w \cdot (100 - t_a) + 2260] \right]$$

wherein the symbols have the following meaning:

| | | |
|---|---|---|
| $G_e$ | kg/h | weight of charge, i.e. initial weight |
| Q | KJ/h | heat output, or heat requirement |
| $t_e$ | °C. | temperature on entry |
| $t_a$ | °C. | temperature at exit |
| $f_e$ | % H₂O | moisture-content of tobacco at entry |
| $f_a$ | % H₂O | moisture-content of tobacco after cooling |
| T | min | time |
| p | kg | bearing load (belt balance) |
| v | m/sec | speed of belt (belt balance) |
| $c_w$ | $\frac{KJ}{kg}$ K | specific heat capacity of water |
| $c_T$ | $\frac{KJ}{kg}$ K | specific heat capacity of tobacco. |

7. The method as defined in claim 6 wherein
the moisture content of the end product is set to undergo treatment, and
the alteration of the quantity of the initial supply of bulk goods to be treated comprises a process control parameter.

8. The method as defined in claim 6 wherein
the required quantity of heat is determined with respect to the output per hour, the required moisture in the end product, and the initial moisture content of said bulk goods,
said heat being conveyed by control means to the drying process and being maintained constant.

9. The method as defined in claim 6 wherein
with continuous operation of the method, an excess or deficiency reading of the initial bulk goods in the supplying step is compensated by operation of a buffer which disposes of excess material or dispenses extra material for deficiencies.

10. The method as defined in claim 6 wherein
the moisture content of the end product is monitored in a theoretical/actual comparison, and
revision of the process parameters is effected by the process computer when long term trend variations occur in the end product.

11. A method of treating bulk goods requiring control of process parameters including moisture content, temperature, and quantity of goods, said method comprising:
(a) supplying a charge bulk goods to be treated with respect to moisture content to a moisture treating zone to produce an end product having a constant predetermined moisture content,
(b) maintaining the process parameters including the heat constant within the moisture treating zone to effect drying of said bulk goods,
(c) providing a computer and control circuits,
(d) continuously monitoring the rate of supply, moisture content of the goods to be treated and the moisture content of the end product,
(e) calculating the weight of the charge of bulk goods with the computer according to the following mathematical formula:

$$G_e = \frac{Q}{[\eta]}$$

$$[\eta] = \left[ \frac{100 - f_e}{100} \cdot C_T \cdot (t_a - t_e) + \frac{f_e}{100} \cdot C_w \cdot (t_a - t_e) + \frac{(100 - f_a) - (100 - f_e)}{100 - f_a} \cdot [C_w \cdot (100 - t_a) + 2260] \right]$$

wherein the symbols have the following meaning:

| | | |
|---|---|---|
| $G_e$ | kg/h | weight of charge, i.e. initial weight |
| Q | KJ/h | heat output, or heat requirement |
| $t_e$ | °C. | temperature on entry |
| $t_a$ | °C. | temperature at exit |
| $f_e$ | % H₂O | moisture-content of tobacco at entry |
| $f_a$ | % H₂O | moisture-content of tobacco after cooling |
| T | min | time |
| p | kg | bearing load (belt balance) |
| v | m/sec | speed of belt (belt balance) |
| $c_w$ | $\frac{KJ}{kg}$ K | specific heat capacity of water |
| $c_T$ | $\frac{KJ}{kg}$ K | specific heat capacity of tobacco, and then |

(f) controlling the rate of supply in the supplying step in response to any value obtained in the calculating step to maintain the remaining process parameters constant.

12. A method of treating bulk goods requiring control of process parameters including moisture content, temperature, and quantity of goods, said method comprising:
(a) supplying a charge of bulk goods to be treated with respect to moisture content to a moisture treating zone to produce an end product having a constant predetermined moisture content after cooling,
(b) providing heat input to the moisture treating zone and heat output from the moisture treating zone,
(c) providing a process computer for evaluating the rate of supply, moisture content of the bulk goods to be treated and the moisture content of the end product after cooling, and
(d) synchronizing the heat output and heat input in the moisture treating zone and controlling the rate of supply in the charge of bulk goods with the process computer according to the following formula:

$$G_e = \frac{Q}{[\eta]}$$

$$[\eta] = \left[ \frac{100 - f_e}{100} \cdot C_T \cdot (t_a - t_e) + \frac{f_e}{100} \cdot C_w \cdot (t_a - t_e) + \frac{(100 - f_a) - (100 - f_e)}{100 - f_a} \cdot [C_w \cdot (100 - t_a) + 2260] \right]$$

wherein the symbols have the following meaning:

| | | |
|---|---|---|
| $G_e$ | kg/h | weight of charge, i.e. initial weight |
| Q | KJ/h | heat output, or heat requirement |
| $t_e$ | °C. | temperature on entry |
| $t_a$ | °C. | temperature at exit |
| $f_e$ | % H₂O | moisture-content of tobacco at entry |
| $f_a$ | % H₂O | moisture-content of tobacco after cooling |
| T | min | time |
| p | kg | bearing load (belt balance) |
| v | m/sec | speed of belt (belt balance) |
| $c_w$ | $\frac{KJ}{kg}$ K | specific heat capacity of water |
| $c_T$ | $\frac{KJ}{kg}$ K | specific heat capacity of tobacco. |

* * * * *